(12) United States Patent
Wu et al.

(10) Patent No.: US 9,288,773 B2
(45) Date of Patent: Mar. 15, 2016

(54) METHODS AND APPARATUS FOR CONTROLLING INTERFERENCE FROM PEER DISCOVERY IN WWAN

(75) Inventors: Xinzhou Wu, Monmouth Junction, NJ (US); Anand Muralidhar, Champaign, IL (US); Hua Wang, Bridgewater, NJ (US); Junyi Li, Chester, NJ (US); Thomas J. Richardson, South Orange, NJ (US); Shailesh Patil, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 13/092,775

(22) Filed: Apr. 22, 2011

(65) Prior Publication Data

US 2012/0269072 A1    Oct. 25, 2012

(51) Int. Cl.
*H04W 52/38*    (2009.01)
*H04W 52/24*    (2009.01)

(52) U.S. Cl.
CPC .......... *H04W 52/383* (2013.01); *H04W 52/242* (2013.01)

(58) Field of Classification Search
CPC .......................... H04W 52/242; H04W 52/383
USPC .......... 370/254, 329, 338, 310.1, 395.3, 242, 370/328; 455/502, 552
See application file for complete search history.

(56) References Cited

U.S. PATENT DOCUMENTS

| | | | |
|---|---|---|---|
| 7,356,347 B1 | 4/2008 | Kammer | |
| 8,583,137 B2 | 11/2013 | Rezaiifar et al. | |
| 2004/0174829 A1* | 9/2004 | Ayyagari | 370/254 |
| 2005/0153702 A1* | 7/2005 | Cuffaro et al. | 455/452.1 |
| 2007/0286136 A1 | 12/2007 | Rittle et al. | |
| 2008/0069062 A1* | 3/2008 | Li et al. | 370/338 |
| 2009/0016250 A1* | 1/2009 | Li et al. | 370/310.1 |
| 2009/0019165 A1* | 1/2009 | Li et al. | 709/227 |
| 2009/0323648 A1* | 12/2009 | Park et al. | 370/338 |
| 2010/0110999 A1 | 5/2010 | Li et al. | |
| 2010/0167743 A1 | 7/2010 | Palanki et al. | |
| 2010/0215024 A1* | 8/2010 | Chiang | 370/338 |
| 2010/0254308 A1 | 10/2010 | Laroia et al. | |
| 2011/0096760 A1 | 4/2011 | Lee et al. | |
| 2011/0170431 A1 | 7/2011 | Palanki et al. | |

FOREIGN PATENT DOCUMENTS

JP    2009017560 A    1/2009
WO    WO-2008109162 A2    9/2008
(Continued)

OTHER PUBLICATIONS

International Search Report and Written Opinion—PCT/US2012/034587—ISA/EPO—Jul. 16, 2012.
(Continued)

*Primary Examiner* — Pao Sinkantarakorn
*Assistant Examiner* — Richard Chang
(74) *Attorney, Agent, or Firm* — Kevin T. Cheatham

(57) ABSTRACT

A method, an apparatus, and a computer program product are provided in which at least one of a peer-to-peer transmit power or a peer-to-peer duty cycle is adjusted based on at least one of a path loss to a serving base station or a path loss to at least one neighboring base station. In addition, a peer-to-peer signal is sent with the peer-to-peer transmit power or the peer-to-peer duty cycle.

25 Claims, 11 Drawing Sheets

(56) References Cited

FOREIGN PATENT DOCUMENTS

WO WO-2009140653 A1 11/2009
WO WO-2010053688 A1 5/2010

OTHER PUBLICATIONS

Qualcomm Europe, "UL Interference Control in the Absence of X2 for Rel 9", 3GPP Draft, R1-091442 ICIC With No X2, 3rd Generation Partnership Project (3GPP), Mobile Competence Centre, 650, Route Des Lucioles, F-06921 Sophia-Antipolis Cedex, France, no. Seoul, Korea, 20090318, Mar. 18, 2009, XP050339016.

Wu, X., et al., "FlashLinQ: A synchronous distributed scheduler for peer-to-peer ad hoc networks", Communication, Control, and Computing(Allerton), 2010 48th Annual Allerton Conference on, IEEE, Sep. 29, 2010, pp. 514-521, XP031899421, DOI: 10.1109/ALLERTON.2010.5706950, ISBN: 978-1-4244-8215-3.

* cited by examiner

METHODS AND APPARATUS FOR CONTROLLING INTERFERENCE FROM PEER DISCOVERY IN WWAN

BACKGROUND

1. Field

The present disclosure relates generally to communication systems, and more particularly, to controlling interference from peer discovery in wireless wide area networks (WWAN).

2. Background

In a WWAN, all communication between wireless devices and a serving base station are through the uplink/downlink channels between the wireless devices and the serving base station. If two communicating wireless devices are in the vicinity of each other, the two wireless devices can communicate directly without going through the base station. Such direct peer-to-peer communication can enable new types of services and/or reduce the traffic load on the base station.

To enable peer-to-peer communication, wireless devices in the vicinity of each other may periodically transmit peer discovery signals. When the peer discovery signals are transmitted at the same time and on the same resources as WWAN communication in a neighboring cell, the peer discovery signals can interfere with the WWAN communication in the neighboring cell. As such, a method of controlling interference from peer discovery in a WWAN is needed.

SUMMARY

In an aspect of the disclosure, a method, an apparatus, and a computer program product are provided in which at least one of a peer-to-peer transmit power or a peer-to-peer duty cycle is adjusted based on at least one of a path loss to a serving base station or a path loss to at least one neighboring base station. In addition, a peer-to-peer signal is sent with the peer-to-peer transmit power or the peer-to-peer duty cycle.

DETAILED DESCRIPTION

Figure 1:
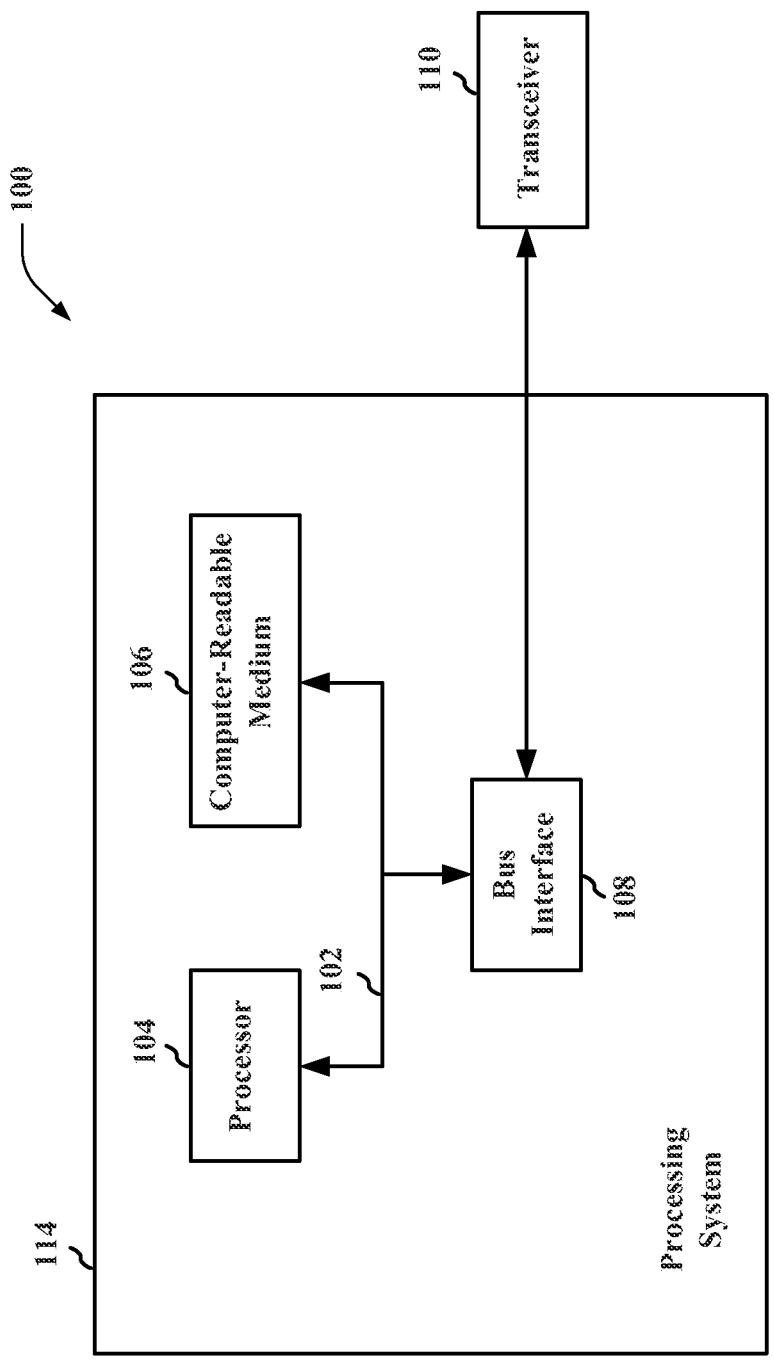
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors and/or hardware modules, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
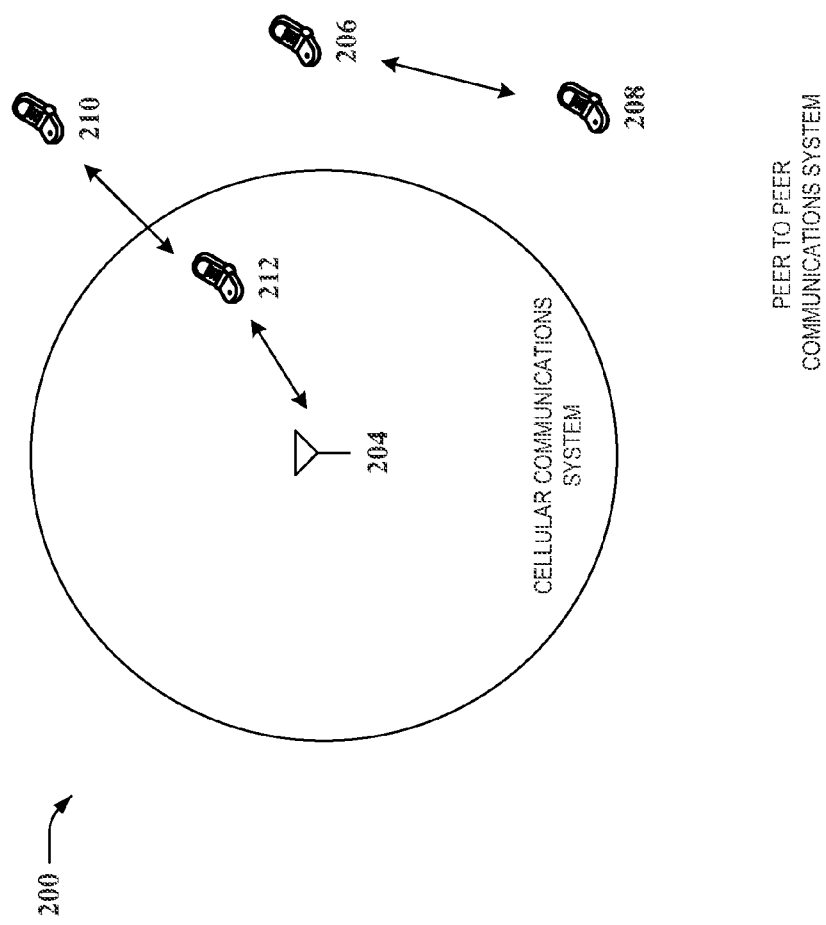
FIG. 2 is a drawing of a wireless peer-to-peer communications system.

FIG. 2 is a drawing of an exemplary peer-to-peer communications system 200. The peer-to-peer communications system 200 includes a plurality of wireless devices 206, 208, 210, 212. The peer-to-peer communications system 200 may overlap with a cellular communications system, such as for example, a wireless wide area network (WWAN). Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 3:
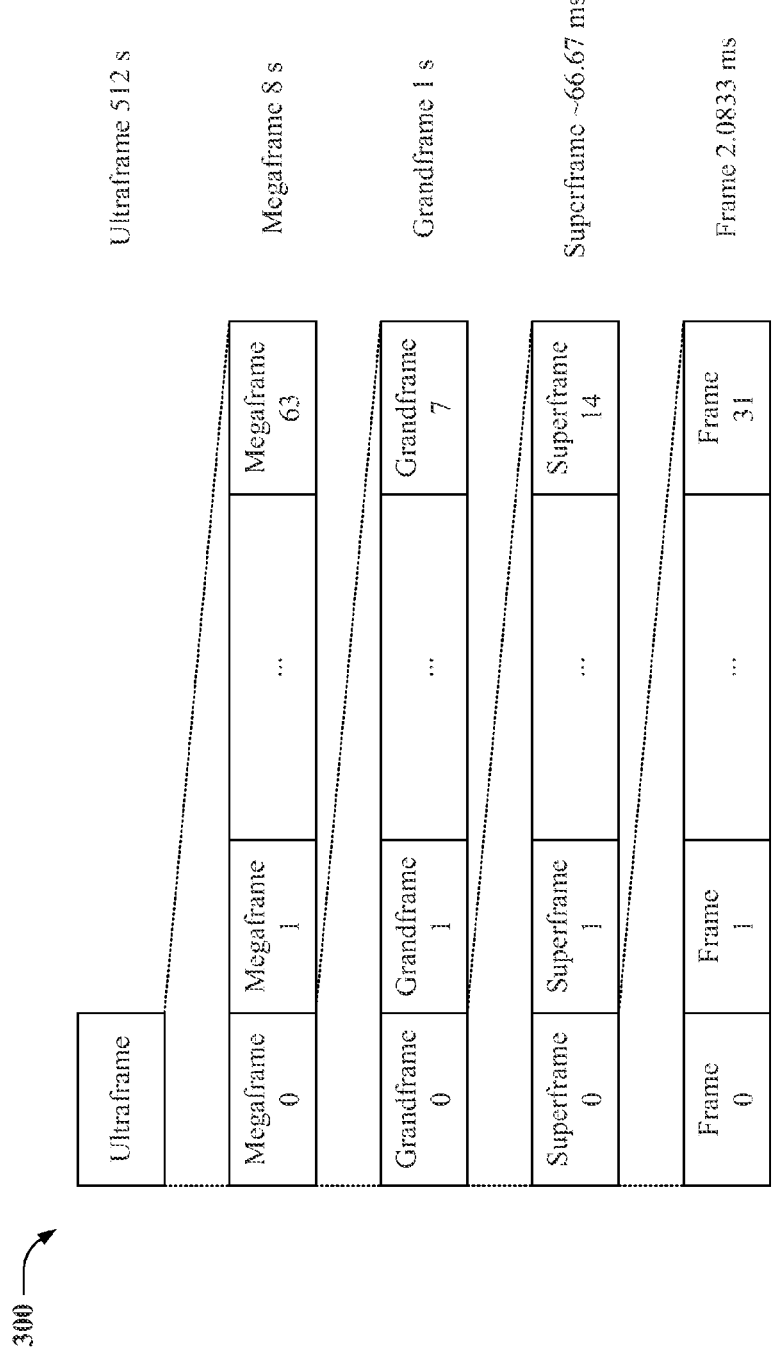
FIG. 3 is a diagram illustrating an exemplary time structure for peer-to-peer communication between the wireless devices.

FIG. 3 is a diagram 300 illustrating an exemplary time structure for peer-to-peer communication between the wireless devices 100. An ultraframe is 512 seconds and includes 64 megaframes. Each megaframe is 8 seconds and includes 8 grandframes. Each grandframe is 1 second and includes 15 superframes. Each superframe is approximately 66.67 ms and includes 32 frames. Each frame is 2.0833 ms.

Figure 4:
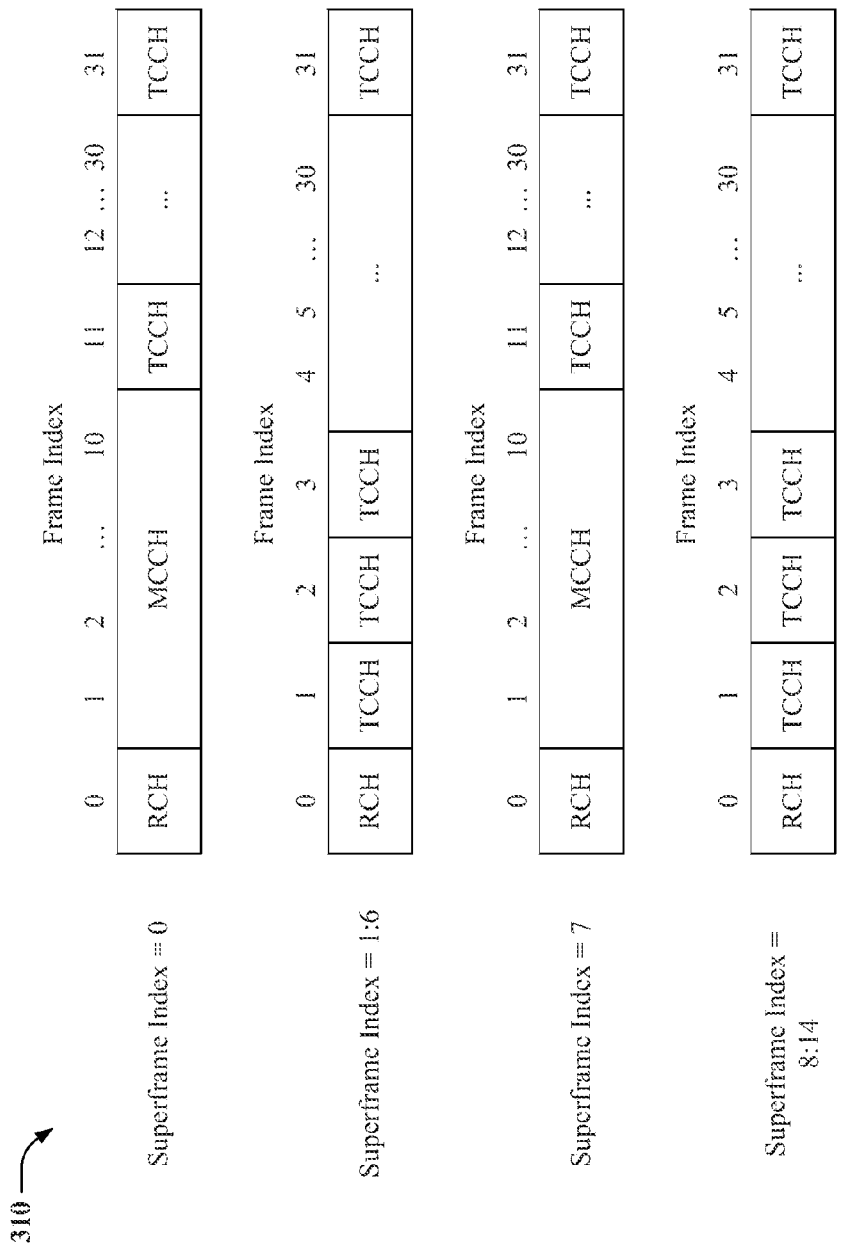
FIG. 4 is a diagram illustrating the channels in each frame of superframes in one grandframe.

FIG. 4 is a diagram 310 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the $2^{nd}$ through $7^{th}$ superframes (with index 1:6), frame 0 is a RCH and frames 1-31 are each a TCCH. In an $8^{th}$ superframe (with index 7), frame 0 is a RCH, frames 1-10 are each a MCCH, and frames 11-31 are each a TCCH. In the $9^{th}$ through $15^{th}$ superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 5:
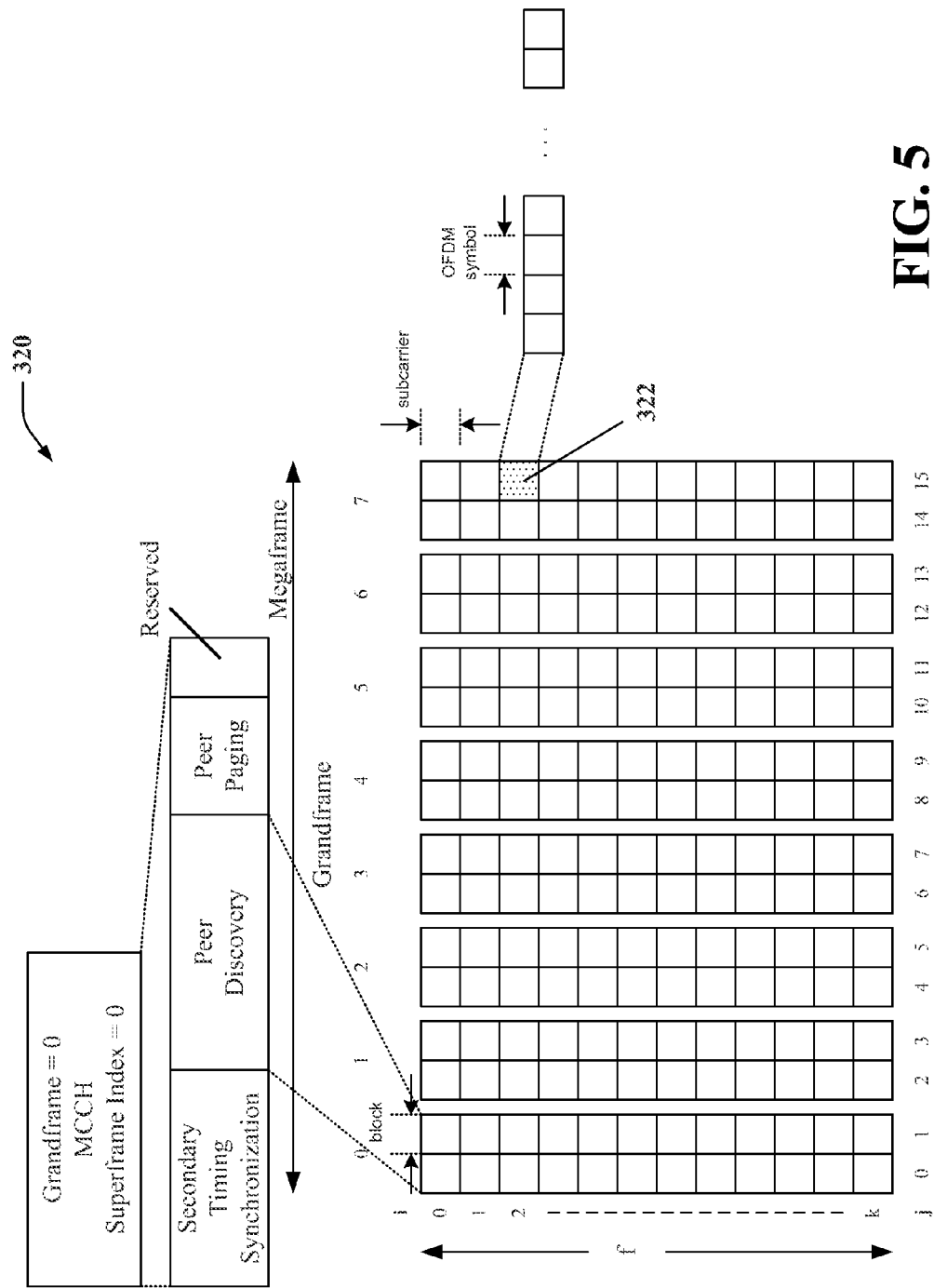
FIG. 5 is a diagram illustrating an operation timeline of a miscellaneous channel and a structure of a peer discovery channel.

FIG. 5 is a diagram 320 illustrating an operation timeline of the MCCH and an exemplary structure of a peer discovery channel. As discussed in relation to FIG. 4, the MCCH of superframe index 0 includes a secondary timing synchronization channel, a peer discovery channel, a peer paging channel, and a reserved slot. The peer discovery channel may be divided into subchannels. For example, the peer discovery channel may be divided into a long range peer discovery channel, a medium range peer discovery channel, a short range peer discovery channel, and other channels. Each of the subchannels may include a plurality of blocks/resources for communicating peer discovery information. Each block may include a plurality of orthogonal frequency divisional multiplexing (OFDM) symbols at the same subcarrier. FIG. 5 provides an example of a subchannel (e.g., short range peer discovery channel) including blocks in one megaframe, which includes the MCCH superframe index 0 of grandframes 0 through 7. Different sets of blocks correspond to different peer discovery resource identifiers (PDRIDs). For example, one PDRID may correspond to one of the blocks in the MCCH superframe index 0 of one grandframe in the megaframe.

Upon power up, a wireless device listens to the peer discovery channel for a period of time (e.g., two megaframes) and selects a PDRID based on a determined energy on each of the PDRIDs. For example, a wireless device may select a PDRID corresponding to block 322 (i=2 and j=15) in a first megaframe of an ultraframe. The particular PDRID may map to other blocks in other megaframes of the ultraframe due to hopping. In blocks associated with the selected PDRID, the wireless device transmits its peer discovery signal. In blocks unassociated with the selected PDRID, the wireless device listens for peer discovery signals transmitted by other wireless devices.

Figure 6:
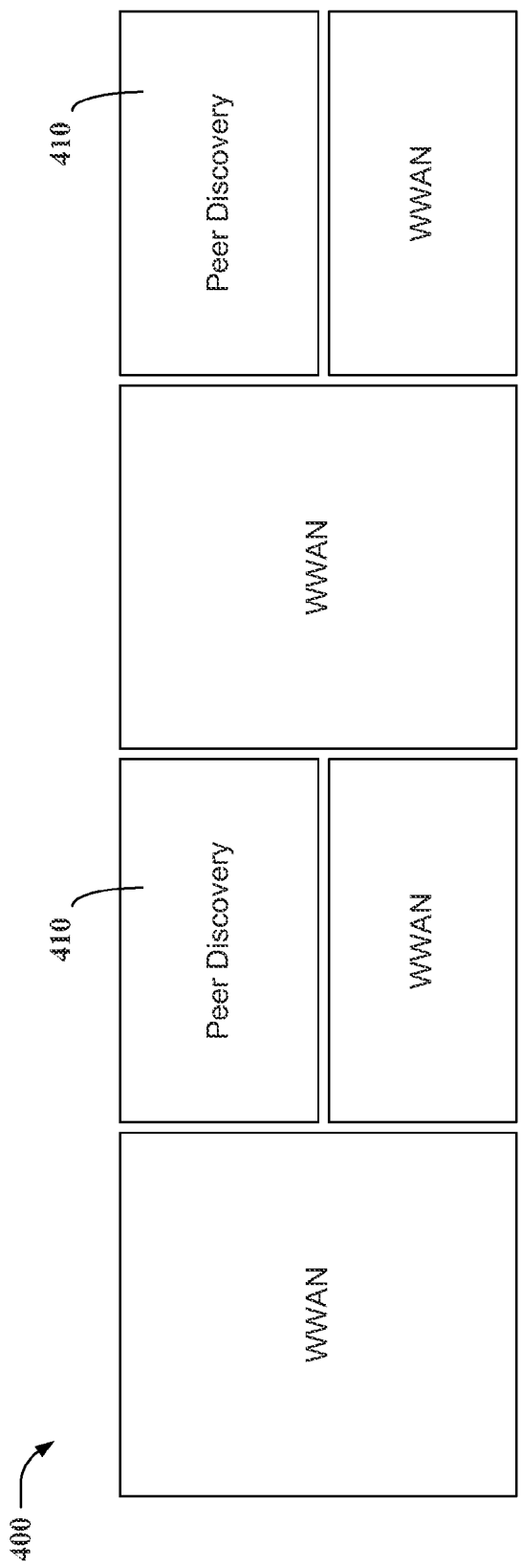
FIG. 6 is a diagram illustrating a partitioning between WWAN and peer-to-peer resources.

FIG. 6 is a diagram 400 illustrating a partitioning between WWAN and peer-to-peer resources. As shown in FIG. 6, a WWAN base station can set aside time frequency resources 410 for wireless devices to transmit peer discovery signals. The peer discovery time frequency resources 410 may be concurrent with downlink and/or uplink WWAN communication. In order to maximize the range of peer discovery, wireless devices ideally should transmit their peer discovery signals at maximum power. However, transmission of peer discovery signals at maximum power can cause interference to WWAN (or other non peer discovery) communication in neighboring cells which are scheduled on the same time/frequency resource. That is, if a neighboring base station partitions WWAN resources that overlap with the peer discovery resources 410 or if WWAN resources of the neighboring base station overlap with the peer discovery resources 410 (e.g., due to lack of synchronization), transmission of peer discovery signals in the peer discovery resources 410 may cause interference to the neighboring base station.

Figure 7:
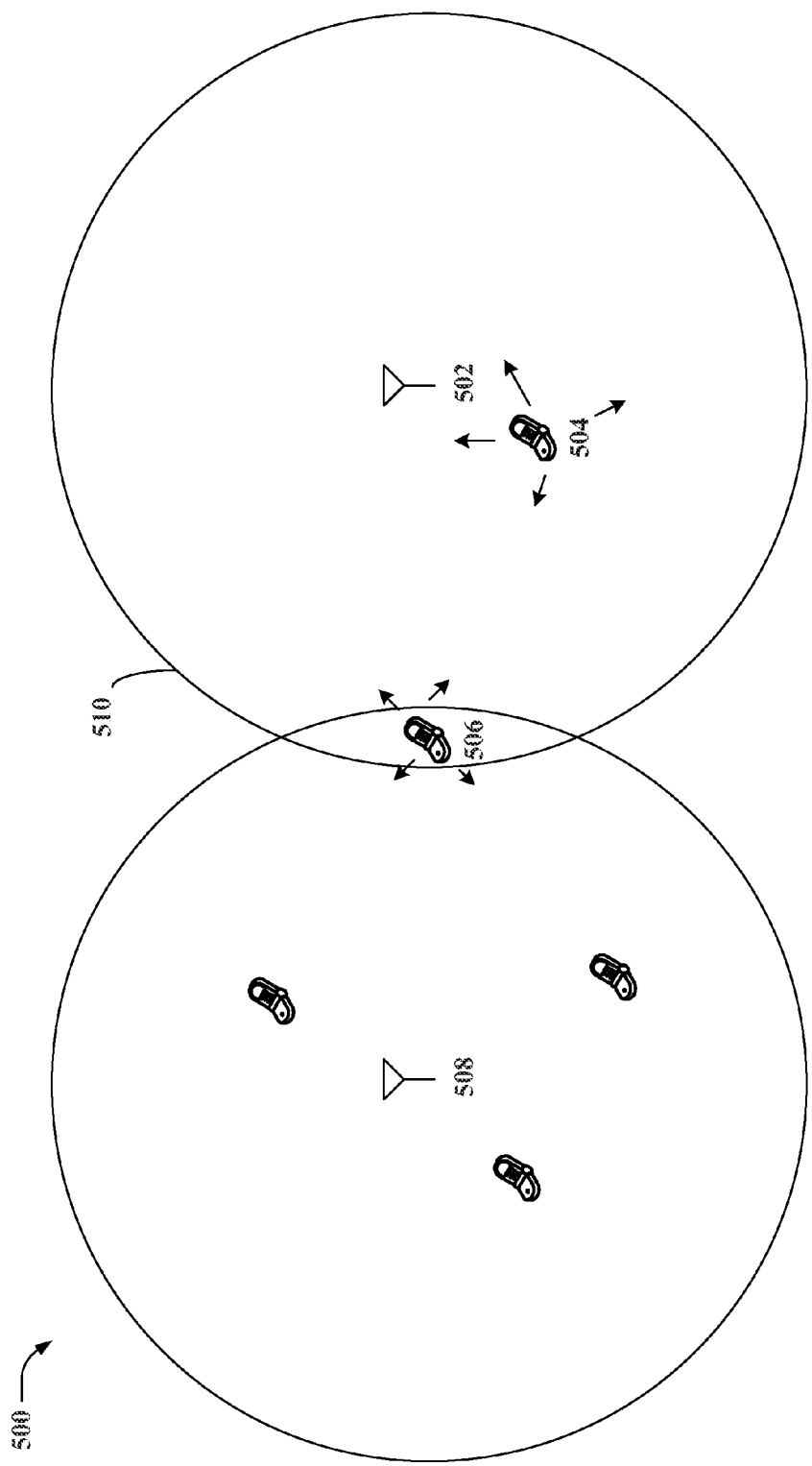
FIG. 7 is a diagram for illustrating an exemplary method for controlling/reducing interference caused by peer-to-peer signaling to WWAN communication in neighboring cells.

FIG. 7 is a diagram 500 for illustrating an exemplary method for controlling/reducing interference caused by peer-to-peer signaling to WWAN communication in neighboring cells. The wireless devices 504, 506 control the interference caused by their peer-to-peer signals by adjusting a peer-to-peer transmit power and/or a peer-to-peer duty cycle based on a path loss to the serving base station 502 or a path loss to the neighboring base station 508. Neighboring base stations are defined herein as base stations to which a wireless device can cause interference through the transmission of peer-to-peer signals. According to the definition, the neighboring base station 508 may not necessarily be adjacent to the serving base station 502. As discussed supra, the peer-to-peer signal may be a peer discovery signal. The wireless device 504 has a relatively low path loss to the serving base station 502 and a relatively high path loss to the neighboring base station 508. However, the wireless device 506 has a relatively high path loss to the serving base station 502 and a relatively low path loss to the neighboring base station 508. As such, a peer discovery signal transmitted from the wireless device 506 will have a greater likelihood of causing interference to WWAN communication of the neighboring base station 508 than a peer discovery signal transmitted from the wireless device 504. Accordingly, in order to control the interference to WWAN communication of the neighboring base station 508, the wireless device 506 transmits its peer discovery signal at a reduced transmit power and/or duty cycle as compared to the wireless device 504.

The wireless devices 504, 506 may receive information from the serving base station 502 indicating the peer-to-peer transmit power and/or the peer-to-peer duty cycle to which to adjust. Alternatively, the wireless devices 504, 506 may determine the peer-to-peer transmit power and/or peer-to-peer duty cycle to which to adjust as a function of their distance to the serving base station 502 and/or the neighboring base station 508. Wireless devices at the cell edge 510, such as the wireless device 506, are likely to cause more interference to WWAN communication of neighboring base stations, such as the neighboring base station 508, than wireless devices closer to the serving base station 502, such as the wireless device 504. As such, the wireless device 506 closer to the cell edge 510 may transmit at a low power and/or duty cycle while the wireless device 504 close to the serving base station 502 may transmit at a high power and/or duty cycle. The position of the wireless device within the cell 510 can be determined from the path loss of signals transmitted by nearby base stations (such as the serving base station 502 and the neighboring base station 508), can be communicated to the wireless device by the serving base station 502, can be determined from the timing advance suggested by the serving base station 502, or by other suitable means.

As discussed supra, the assignment of the peer discovery transmit power and/or peer discovery duty cycle can be made by the serving base station 502 or determined independently by the wireless devices 504, 506. When the transmit power and/or duty cycle is determined by the serving base station 502, the serving base station 502 can select the transmit power and/or duty cycle based on maintaining a total interference budget of the cell as if all wireless devices are transmitting WWAN uplink signals. For example, a typical uplink scheduling protocol enforces the following:

$$\sum_i \frac{\sum_{b \neq c(i)} H_{i,b}}{H_{i,c(i)}} P_i \leq Q,$$

where $P_i$ is the received power from the $i^{th}$ wireless device, H is the channel gain, $H_{i,c(i)}$ is the channel gain for the serving base station, $H_{i,b}$ for $b \neq c(i)$ are the channel matrices for neighboring base stations, $$\frac{\sum_{b \neq c(i)} H_{i,b}}{H_{i,c(i)}}$$

is a path loss ratio, and Q is the interference budget of the cell. When peer discovery signals are present, the base station 502 can determine the transmit power and/or the duty cycle of the peer discovery transmissions such that $$\sum_{i \in P2P} \frac{\sum_{b \neq c(i)} H_{i,b}}{H_{i,c(i)}} P_{max} \alpha_i + \sum_{i \in WWAN} \frac{\sum_{b \neq c(i)} H_{i,b}}{H_{i,c(i)}} P_i \leq Q,$$

where $\alpha_i$ is a scaling factor for the duty cycle or the maximum power $P_{max}$ for the $i^{th}$ wireless device, where $\alpha_i \leq 1$.

For example, for the diagram illustrating in FIG. 7, the base station 502 may determine the transmit power and/or the duty cycle of the peer discovery transmissions such that $$\frac{H_{504,508}}{H_{504,502}} P_{max} \alpha_{504} + \frac{H_{506,508}}{H_{506,502}} P_{max} \alpha_{506} \leq Q - Q_{WWAN},$$

where $H_{504,508}$ is the channel gain between the wireless device 504 and the base station 508 ($1/H_{504,508}$ is the path loss between the wireless device 504 and the base station 508), $H_{504,502}$ is the channel gain between the wireless device 504 and the base station 502 ($1/H_{504,502}$ is the path loss between the wireless device 504 and the base station 502), $H_{506, 508}$ is the channel gain between the wireless device 506 and the base station 508 ($1/H_{506, 508}$ is the path loss between the wireless device 506 and the base station 508), $H_{506, 502}$ is the channel gain between the wireless device 506 and the base station 502 ($1/H_{506, 502}$ is the path loss between the wireless device 506 and the base station 502), Q is the interference budget of the cell, and $Q_{WWAN}$ is reduction to the interference budget due to the WWAN communication.

For the wireless device 504 close to the serving base station 502, the path loss ratio $H_{504, 508}/H_{504, 502}$ (i.e., the path loss of the serving base station 502 divided by the path loss to the neighboring base station 508) is very small and therefore the scaling factor $\alpha_{504}$ for the transmit power and/or duty cycle may be close to 1. However, for the wireless device 506 farther from the serving base station 502, the path loss ratio $H_{506, 508}/H_{506, 502}$ (i.e., the path loss of the serving base station 502 divided by the path loss to the neighboring base station 508) is relatively large and therefore the scaling factor $\alpha_{506}$ for the transmit power and/or duty cycle should be smaller so as to maintain the specific interference budget of the cell less than or equal to $Q-Q_{WWAN}$.

Referring again to FIG. 5. The transmit power may be adjusted by the wireless device by transmitting at the adjusted transmit power for each OFDM symbol within its assigned block in each of the megaframes. The duty cycle may be adjusted by the wireless device by transmitting in an assigned block of a subset of the megaframes within an ultraframe. For example, rather than transmit in each megaframe, the wireless device 506 on the cell edge 510 may reduce its duty cycle by transmitting in assigned blocks in x megaframes of an ultraframe, where x<64 (e.g., x/64≤α). A wireless device may adjust its duty cycle and transmit power concurrently.

Figure 8:
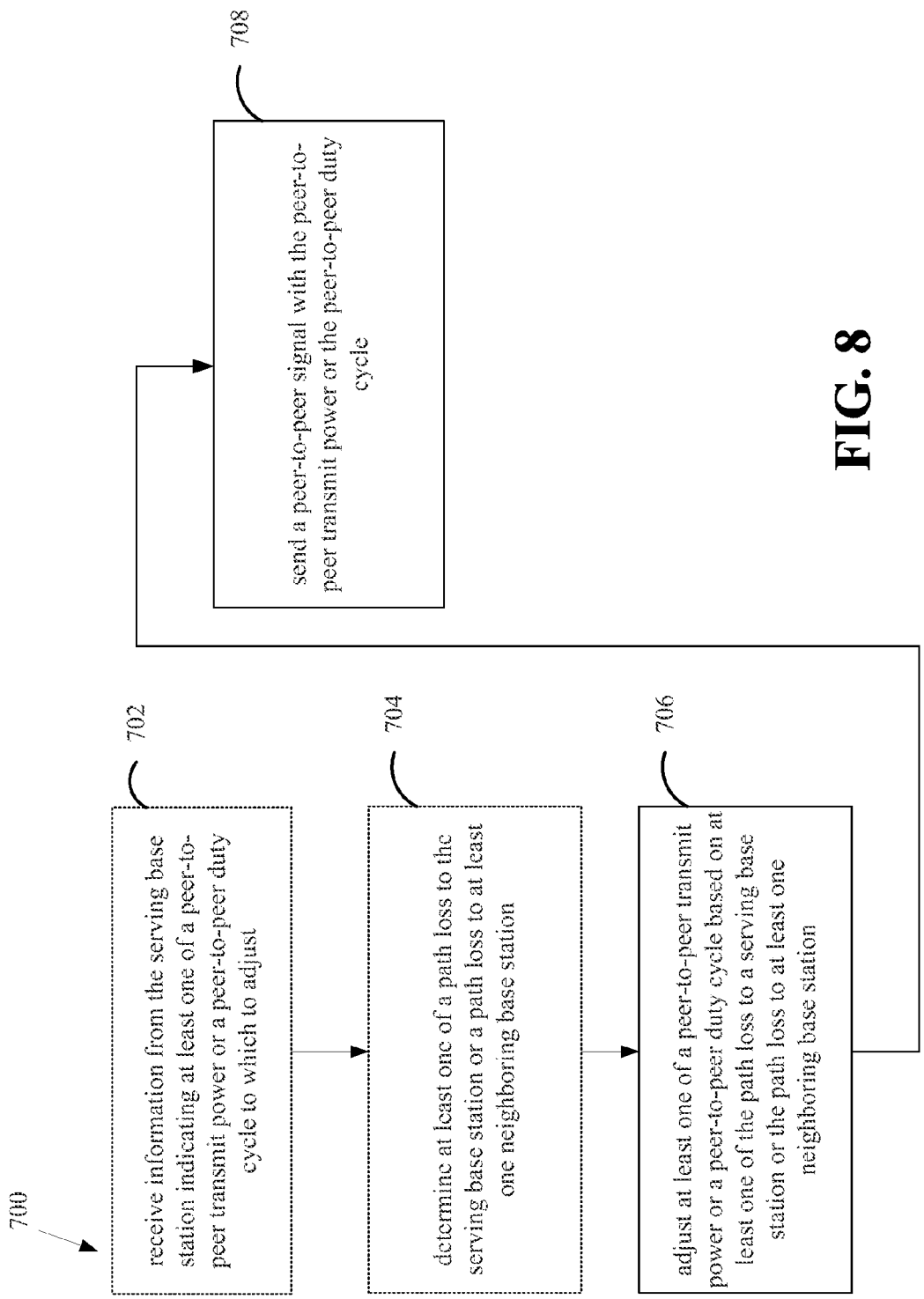
FIG. 8 is a flow chart of a method of wireless communication.

FIG. 8 is a flow chart 700 of a method of wireless communication. The method is performed by a wireless device, such as the wireless device 506. As shown in FIG. 8, the wireless device 506 may receive information from the serving base station 502 indicating at least one of a peer-to-peer transmit power or a peer-to-peer duty cycle to which to adjust (702). Alternatively, the wireless device 506 may independently determine at least one of a path loss to the serving base station 502 or a path loss to at least one neighboring base station, such as the neighboring base station 508 (704). The wireless device 506 adjusts at least one of a peer-to-peer transmit power or a peer-to-peer duty cycle based on at least one of a path loss to a serving base station 502 or a path loss to at least one neighboring base station (706). The wireless device 506 then sends a peer-to-peer signal with the peer-to-peer transmit power or the peer-to-peer duty cycle (708). As discussed supra, the peer-to-peer signal may be a peer discovery signal, the peer-to-peer transmit power may be a peer discovery transmit power for transmitting the peer discovery signal, and the peer-to-peer duty cycle may be a peer discovery duty cycle for transmitting the peer discovery signal.

Figure 9:
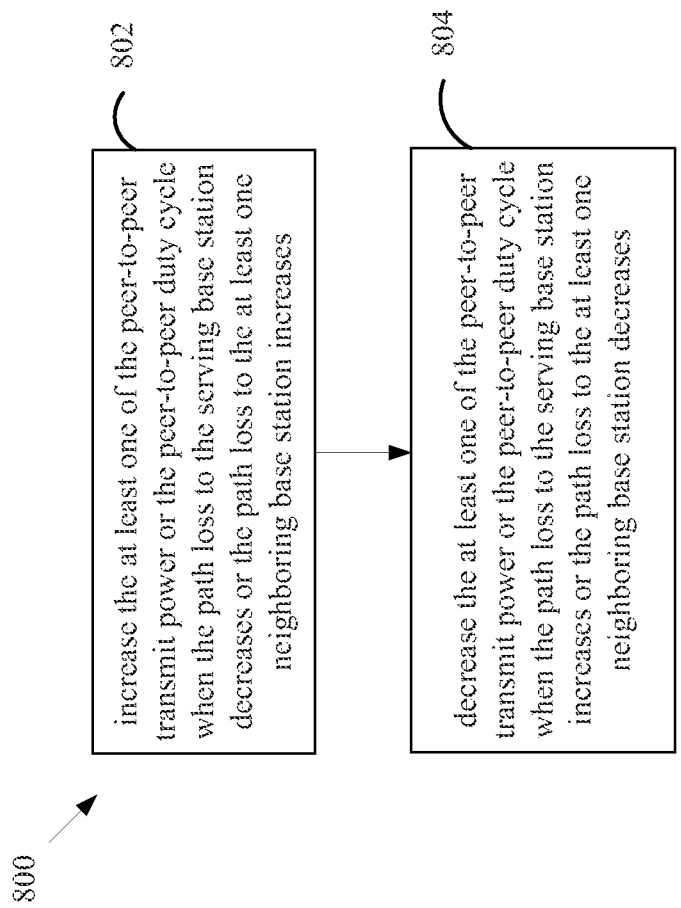
FIG. 9 is a flow chart of another method of wireless communication.

FIG. 9 is a flow chart 800 of another method of wireless communication. As shown in FIG. 9, the wireless device 506 may adjust its transmit power and/or duty cycle by increasing the at least one of the peer-to-peer transmit power or the peer-to-peer duty cycle when the path loss to the serving base station 502 decreases or the path loss to the at least one neighboring base station 508 increases (802). In addition, the wireless device 506 may adjust its transmit power and/or duty cycle by decreasing the at least one of the peer-to-peer transmit power or the peer-to-peer duty cycle when the path loss to the serving base station 502 increases or the path loss to the at least one neighboring base station 508 decreases (804).

Figure 10:
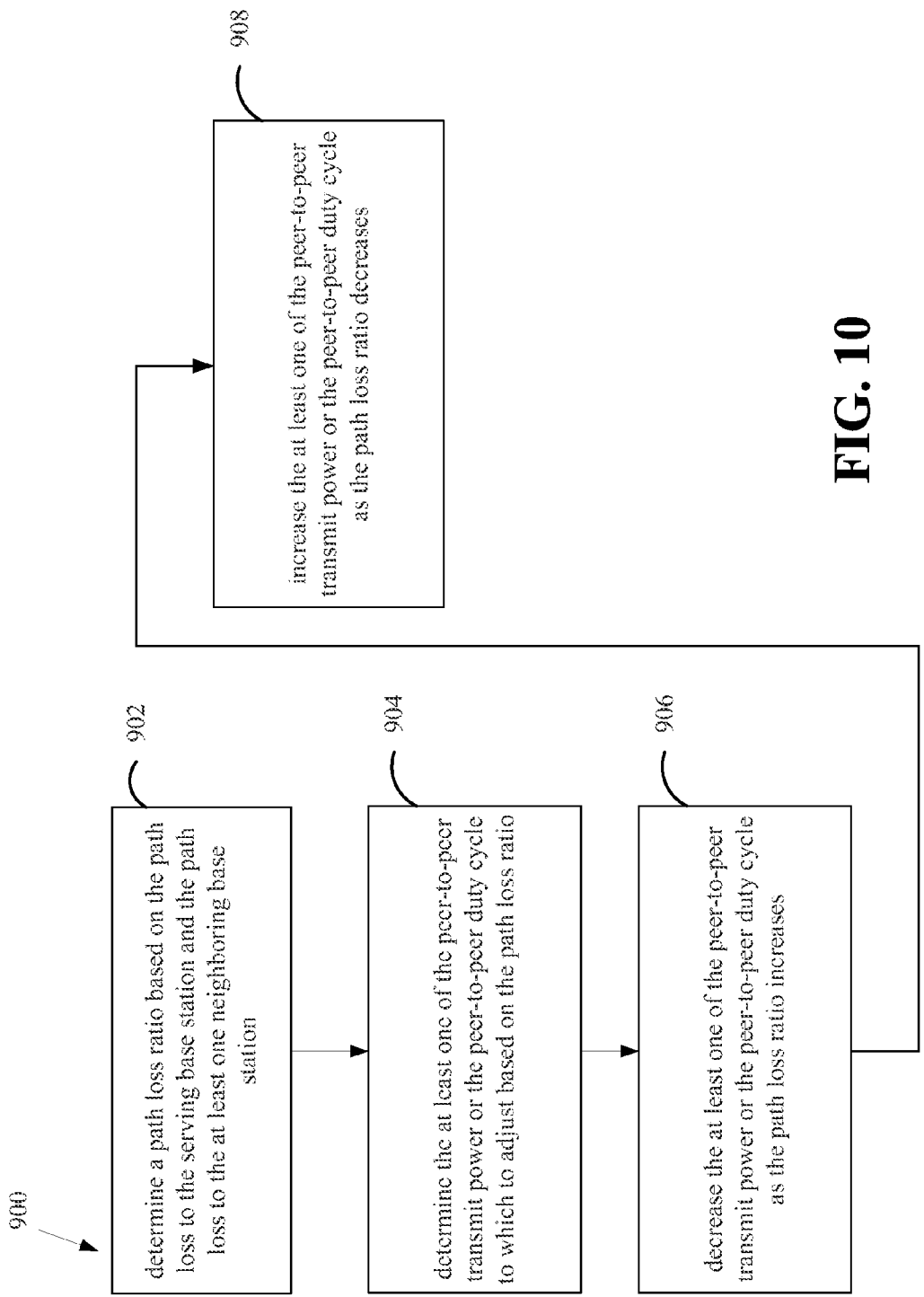
FIG. 10 is a flow chart of yet another method of wireless communication.

FIG. 10 is a flow chart 900 of an exemplary method. As shown in FIG. 10, the wireless device 506 may determine a path loss ratio based on the path loss to the serving base station 502 and the path loss to the at least one neighboring base station 508 (902). For example, the wireless device 506 may determine the path loss ratio equal to $H_{506, 508}/H_{506, 502}$. The wireless device then determines the at least one of the peer-to-peer transmit power or the peer-to-peer duty cycle to which to adjust based on the path loss ratio (904). The path loss ratio may be a sum of the path loss to the serving base station divided by the path loss to each of the at least one neighboring base station. For example, assume there are three nearby base stations, $BS_1$, $BS_2$, and $BS_3$, and the $BS_1$ is the serving base station and the $BS_2$ and the $BS_3$ are neighboring base stations (e.g., base stations in WWAN communication to which the wireless device may cause interference). In such a situation, the path loss ratio may be equal to $$(H_2 + H_3)/H_1 = \left(\frac{1}{H_1} \bigg/ \frac{1}{H_2}\right) + \left(\frac{1}{H_1} \bigg/ \frac{1}{H_3}\right).$$

The wireless device 506 may adjust the transmit power and/or duty cycle by decreasing the at least one of the peer-to-peer transmit power or the peer-to-peer duty cycle as the path loss ratio increases (906) and by increasing the at least one of the peer-to-peer transmit power or the peer-to-peer duty cycle as the path loss ratio decreases (908).

Figure 11:
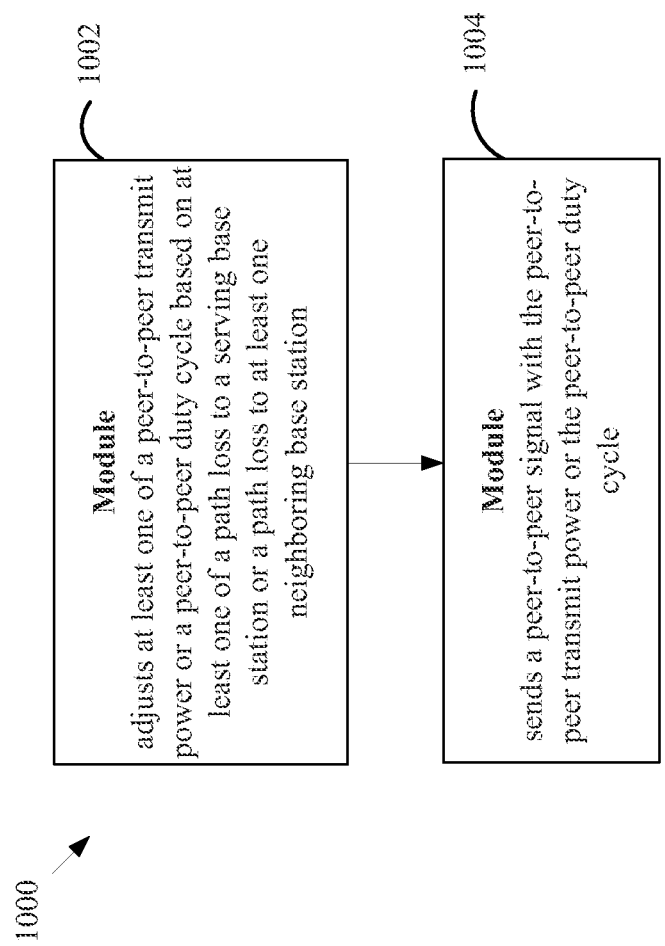
FIG. 11 is a conceptual block diagram illustrating the functionality of an exemplary apparatus.

FIG. 11 is a conceptual block diagram 1000 illustrating the functionality of an exemplary apparatus 100. The apparatus 100 includes a module 1002 that adjusts at least one of a peer-to-peer transmit power or a peer-to-peer duty cycle based on at least one of a path loss to a serving base station or a path loss to at least one neighboring base station. The apparatus 100 further includes a module 1004 that sends a peer-to-peer signal with the peer-to-peer transmit power or the peer-to-peer duty cycle. The apparatus 100 may include additional modules that perform each of the steps in the aforementioned flow charts. As such, each step in the aforementioned flow charts may be performed by a module and the apparatus 100 may include one or more of those modules.

Referring to FIG. 1, in one configuration, the apparatus 100 for wireless communication includes means for adjusting at least one of a peer-to-peer transmit power or a peer-to-peer duty cycle based on at least one of a path loss to a serving base station or a path loss to at least one neighboring base station, and means for sending a peer-to-peer signal with the peer-to-peer transmit power or the peer-to-peer duty cycle. The apparatus 100 may further include means for receiving information from the serving base station indicating at least one of the peer-to-peer transmit power or the peer-to-peer duty cycle to which to adjust. The means for adjusting may include at least one of means for increasing the at least one of the peer-to-peer transmit power or the peer-to-peer duty cycle when the path loss to the serving base station decreases or the path loss to the at least one neighboring base station increases, and means for decreasing the at least one of the peer-to-peer transmit power or the peer-to-peer duty cycle when the path loss to the serving base station increases or the path loss to the at least one neighboring base station decreases. The apparatus 100 may further include means for determining a path loss ratio based on the path loss to the serving base station and the path loss to the at least one neighboring base station, and means for determining the at least one of the peer-to-peer transmit power or the peer-to-peer duty cycle to which to adjust based on the path loss ratio. In such a configuration, the means for adjusting may include means for decreasing the at least one of the peer-to-peer transmit power or the peer-to-peer duty cycle as the path loss ratio increases, and means for increasing the at least one of the peer-to-peer transmit power or the peer-to-peer duty cycle as the path loss ratio decreases. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   determining a path loss ratio based on a path loss to a serving base station from a mobile device and a path loss to at least one neighboring base station from the mobile device;
   determining at least one of a peer-to-peer transmit power or a peer-to-peer duty cycle to which to adjust based on the path loss ratio;
   adjusting the at least one of the peer-to-peer transmit power or the peer-to-peer duty cycle based on at least one of the path loss to the serving base station or the path loss to the at least one neighboring base station, wherein the adjusting includes adjusting the peer-to-peer duty cycle; and
   sending a peer discovery signal with at least one of the adjusted peer-to-peer transmit power or the adjusted peer-to-peer duty cycle, wherein the peer discovery signal includes the adjusted peer-to-peer duty cycle and wherein the peer-to-peer transmit power is a peer discovery transmit power for transmitting the peer discovery signal.

2. The method of claim 1, wherein the peer-to-peer duty cycle is a peer discovery duty cycle for transmitting the peer discovery signal.

3. The method of claim 1, further comprising receiving information from the serving base station indicating at least one of the peer-to-peer transmit power or the peer-to-peer duty cycle to which to adjust.

4. The method of claim 1, wherein the adjusting comprises at least one of:
   increasing the at least one of the peer-to-peer transmit power or the peer-to-peer duty cycle when the path loss to the serving base station decreases or the path loss to the at least one neighboring base station increases; and
   decreasing the at least one of the peer-to-peer transmit power or the peer-to-peer duty cycle when the path loss to the serving base station increases or the path loss to the at least one neighboring base station decreases.

5. The method of claim 1, wherein the path loss ratio is a function of the path loss to the serving base station and the path loss to each of the at least one neighboring base station.

6. A method of wireless communication, comprising:
   determining a path loss ratio based on a path loss to a serving base station and a path loss to at least one neighboring base station, wherein the path loss ratio is a sum of the path loss to the serving base station divided by the path loss to each of the at least one neighboring base station;
   determining at least one of a peer-to-peer transmit power or a peer-to-peer duty cycle to which to adjust based on the path loss ratio;
   adjusting at least one of the peer-to-peer transmit power or the peer-to-peer duty cycle based on at least one of the path loss to the serving base station or the path loss to the at least one neighboring base station; and
   sending a peer-to-peer signal with the adjusted peer-to-peer transmit power or the peer-to-peer duty cycle,
   wherein the peer-to-peer signal is a peer discovery signal and the peer-to-peer transmit power is a peer discovery transmit power for transmitting the peer discovery signal.

7. The method of claim 6, wherein the adjusting comprises:
   decreasing the at least one of the peer-to-peer transmit power or the peer-to-peer duty cycle as the path loss ratio increases; and
   increasing the at least one of the peer-to-peer transmit power or the peer-to-peer duty cycle as the path loss ratio decreases.

8. An apparatus for wireless communication, comprising:
   means for determining a path loss ratio based on a path loss to a serving base station from a mobile device and a path loss to at least one neighboring base station from the mobile device;
   means for determining at least one of a peer-to-peer transmit power or a peer-to-peer duty cycle to which to adjust based on the path loss ratio;
   means for adjusting the at least one of the peer-to-peer transmit power or the peer-to-peer duty cycle based on at least one of the path loss to the serving base station or the path loss to the at least one neighboring base station, wherein the means for adjusting is configured to adjust the peer-to-peer duty cycle; and
   means for sending a peer discovery signal with at least one of the adjusted peer-to-peer transmit power or the adjusted peer-to-peer duty cycle, wherein the peer discovery signal includes the adjusted peer-to-peer duty cycle and wherein the peer-to-peer transmit power is a peer discovery transmit power for transmitting the peer discovery signal.

9. The apparatus of claim 8, wherein peer-to-peer duty cycle is a peer discovery duty cycle for transmitting the peer discovery signal.

10. The apparatus of claim 8, further comprising means for receiving information from the serving base station indicating at least one of the peer-to-peer transmit power or the peer-to-peer duty cycle to which to adjust.

11. The apparatus of claim 8, wherein the means for adjusting comprises at least one of:
means for increasing the at least one of the peer-to-peer transmit power or the peer-to-peer duty cycle when the path loss to the serving base station decreases or the path loss to the at least one neighboring base station increases; and
means for decreasing the at least one of the peer-to-peer transmit power or the peer-to-peer duty cycle when the path loss to the serving base station increases or the path loss to the at least one neighboring base station decreases.

12. An apparatus for wireless communication, comprising:
means for determining a path loss ratio based on a path loss to a serving base station and a path loss to at least one neighboring base station, wherein the path loss ratio is a sum of the path loss to the serving base station divided by the path loss to each of the at least one neighboring base station;
means for determining at least one of a peer-to-peer transmit power or a peer-to-peer duty cycle to which to adjust based on the path loss ratio;
means for adjusting at least one of the peer-to-peer transmit power or the peer-to-peer duty cycle based on at least one of the path loss to the serving base station or the path loss to the at least one neighboring base station; and
means for sending a peer-to-peer signal with the adjusted peer-to-peer transmit power or the peer-to-peer duty cycle,
wherein the peer-to-peer signal is a peer discovery signal and the peer-to-peer transmit power is a peer discovery transmit power for transmitting the peer discovery signal.

13. The apparatus of claim 12, wherein the means for adjusting comprises:
means for decreasing the at least one of the peer-to-peer transmit power or the peer-to-peer duty cycle as the path loss ratio increases; and
means for increasing the at least one of the peer-to-peer transmit power or the peer-to-peer duty cycle as the path loss ratio decreases.

14. A non-transitory computer-readable medium storing computer executable code for wireless communication, comprising code for:
determining a path loss ratio based on a path loss to a serving base station from a mobile device and a path loss to at least one neighboring base station from the mobile device;
determining at least one of a peer-to-peer transmit power or a peer-to-peer duty cycle to which to adjust based on the path loss ratio;
adjusting the at least one of the peer-to-peer transmit power or the peer-to-peer duty cycle based on at least one of the path loss to the serving base station or the path loss to the at least one neighboring base station, wherein the code for adjusting comprises code for adjusting the peer-to-peer duty cycle; and
sending a peer discovery signal with at least one of the adjusted peer-to-peer transmit power or the adjusted peer-to-peer duty cycle, wherein the peer discovery signal includes the adjusted peer-to-peer duty cycle and wherein the peer-to-peer transmit power is a peer discovery transmit power for transmitting the peer discovery signal.

15. The non-transitory computer-readable medium of claim 14, wherein the peer-to-peer duty cycle is a peer discovery duty cycle for transmitting the peer discovery signal.

16. The non-transitory computer-readable medium of claim 14, further comprising code for receiving information from the serving base station indicating at least one of the peer-to-peer transmit power or the peer-to-peer duty cycle to which to adjust.

17. The non-transitory computer-readable medium of claim 14, wherein the code for adjusting comprises code for at least one of:
increasing the at least one of the peer-to-peer transmit power or the peer-to-peer duty cycle when the path loss to the serving base station decreases or the path loss to the at least one neighboring base station increases; and
decreasing the at least one of the peer-to-peer transmit power or the peer-to-peer duty cycle when the path loss to the serving base station increases or the path loss to the at least one neighboring base station decreases.

18. A non-transitory computer-readable medium storing computer executable code for wireless communication, comprising code for:
determining a path loss ratio based on a path loss to a serving base station and a path loss to at least one neighboring base station, wherein the path loss ratio is a sum of the path loss to the serving base station divided by the path loss to each of the at least one neighboring base station;
determining at least one of a peer-to-peer transmit power or a peer-to-peer duty cycle to which to adjust based on the path loss ratio;
adjusting at least one of the peer-to-peer transmit power or the peer-to-peer duty cycle based on at least one of the path loss to the serving base station or the path loss to the at least one neighboring base station; and
sending a peer-to-peer signal with the adjusted peer-to-peer transmit power or the peer-to-peer duty cycle,
wherein the peer-to-peer signal is a peer discovery signal and the peer-to-peer transmit power is a peer discovery transmit power for transmitting the peer discovery signal.

19. The non-transitory computer-readable medium of claim 18, wherein the code for adjusting comprises code for:
decreasing the at least one of the peer-to-peer transmit power or the peer-to-peer duty cycle as the path loss ratio increases; and
increasing the at least one of the peer-to-peer transmit power or the peer-to-peer duty cycle as the path loss ratio decreases.

20. An apparatus for wireless communication, comprising:
a memory; and
at least one processor coupled to the memory and configured to:
determine a path loss ratio based on a path loss to a serving base station from a mobile device and a path loss to at least one neighboring base station from the mobile device;
determine at least one of a peer-to-peer transmit power or a peer-to-peer duty cycle to which to adjust based on the path loss ratio;
adjust the at least one of the peer-to-peer transmit power or the peer-to-peer duty cycle based on at least one of the path loss to the serving base station or the path loss to the at least one neighboring base station, wherein the processing system is configured to adjust the peer-to-peer duty cycle; and send a peer discovery signal with at least one of the adjusted peer-to-peer transmit power or the adjusted peer-to-peer duty cycle, wherein the peer discovery signal includes the adjusted peer-to-peer duty cycle and wherein the peer-to-peer transmit power is a peer discovery transmit power for transmitting the peer discovery signal.

21. The apparatus of claim 20, wherein the peer-to-peer duty cycle is a peer discovery duty cycle for transmitting the peer discovery signal.

22. The apparatus of claim 20, wherein the at least one processor is further configured to receive information from the serving base station indicating at least one of the peer-to-peer transmit power or the peer-to-peer duty cycle to which to adjust.

23. The apparatus of claim 20, wherein to adjust the at least one of the peer-to-peer transmit power or the peer-to-peer duty cycle, the at least one processor is configured to perform at least one of:
    increasing the at least one of the peer-to-peer transmit power or the peer-to-peer duty cycle when the path loss to the serving base station decreases or the path loss to the at least one neighboring base station increases; and
    decreasing the at least one of the peer-to-peer transmit power or the peer-to-peer duty cycle when the path loss to the serving base station increases or the path loss to the at least one neighboring base station decreases.

24. An apparatus for wireless communication, comprising:
a memory; and
at least one processor coupled to the memory and configured to:
    determine a path loss ratio based on a path loss to a serving base station and a path loss to at least one neighboring base station, wherein the path loss ratio is a sum of the path loss to the serving base station divided by the path loss to each of the at least one neighboring base station;
    determine at least one of a peer-to-peer transmit power or a peer-to-peer duty cycle to which to adjust based on the path loss ratio;
    adjust at least one of the peer-to-peer transmit power or the peer-to-peer duty cycle based on at least one of the path loss to the serving base station or the path loss to the at least one neighboring base station; and
    send a peer-to-peer signal with the adjusted peer-to-peer transmit power or the peer-to-peer duty cycle,
    wherein the peer-to-peer signal is a peer discovery signal and the peer-to-peer transmit power is a peer discovery transmit power for transmitting the peer discovery signal.

25. The apparatus of claim 24, wherein to adjust the at least one of the peer-to-peer transmit power or the peer-to-peer duty cycle, the at least one processor is configured to:
    decrease the at least one of the peer-to-peer transmit power or the peer-to-peer duty cycle as the path loss ratio increases; and
    increase the at least one of the peer-to-peer transmit power or the peer-to-peer duty cycle as the path loss ratio decreases.

* * * * *